United States Patent Office 2,947,710
Patented Aug. 2, 1960

2,947,710

PRESSURE SENSITIVE ADHESIVE COMPOSITION AND TAPE COATED THEREWITH

Verne L. Frantz, Deans, N.J., assignor, by mesne assignments, to Johnson & Johnson, New Brunswick, N.J., a corporation of New Jersey No Drawing. Filed Nov. 15, 1955, Ser. No. 547,040

2 Claims. (Cl. 260—5)

This invention relates to a normally tacky and pressure-sensitive adhesive sheet material and, more particularly, to a normally tacky and pressure-sensitive adhesive tape in which the adhesive is a pressure-sensitive adhesive mass having improved flame retardant and flame proof characteristics.

Conventional normally tacky adhesives are compounded from a composition including an elastomeric component, which is usually a natural or synthetic rubber or similar elastomeric polymer, and a resinous component compatible with the rubber and adapted to impart tack to the adhesive composition, together with suitable amounts of various types of additives such as conventional fillers, antioxidants, etc. The elastomeric component, tackifying resin, and fillers, when used, are proportioned to obtain in the adhesive properties of very high internal strength and cohesiveness and high adhesiveness.

In many commercial applications of normally tacky and pressure-sensitive adhesives and tapes employing such adhesives, it is an essential requirement that the adhesives be flame retardant and flame proof. Such characteristics are required, for example, of adhesives utilized in the aircraft industry, heat duct sealing and for movie screen splicing. Many of the hitherto known adhesives are not suitable for such purposes because of their poor flame retardant and flame proof characteristics. Other known flame resistant compositions, although possessing adequate flame retardant and flame proof qualities, are lacking in high internal strength, cohesiveness and adhesiveess or other essential characteristics to be effective as commercially acceptable adhesives.

Objects and advantages of the invention will be set forth in part hereinafter and in part will be obvious herefrom, or may be learned by practice with the invention, the same being realized and attained by means of the compositions, methods, combinations and improvements pointed out in the appended claims.

The invention consists in the novel compositions, methods, combinations and improvements herein shown and described.

Accordingly, it is an object of this invention to provide novel normally tacky and pressure sensitive adhesives having excellent flame retardant and flame proof characteristics which exhibit a high overall adhesive performance. A further object of this invention is to provide novel normally tacky and pressure sensitive adhesive sheetings, and in particular tapes, possessing high flame retardant and flame proof qualities and suitable adhesive tape performance characteristics. A still further object is to provide a novel method for producing adhesives and adhesive sheetings, and in particular tapes, having the attributes set forth in the foregoing objects.

This invention is based upon the discovery that pressure-sensitive adhesives possessing high flame retardant and flame proof characteristics may be formed by the combination of elastomeric polymers, comprising at least one chlorine containing elastomeric polymer and one other elastomeric polymer, tackifying resins comprising at least one chlorine containing tackifying resin and one other tackifying resin, and antimony trioxide.

It has been found that the presence of antimony trioxide in the aforementioned compositions results in novel adhesives which are highly effective in resisting flames. The exact mechanism involved when such adhesives are subjected to flame is not entirely clear and this invention is not limited to any theory of action. Antimony trioxide in itself does not possess substantial flame retardant and flame proof characteristics. It has been found, however, that antimony trioxide when subjected to a flame appears to react with the chlorine containing elastomer polymer and chlorine containing tackifying resin of the adhesive, such reaction causing a smothering effect on the flame which further enhances or contributes to the excellent flame retardant and flame proof characteristics of the adhesives of this invention.

As indicated heretofore, the elastomeric polymers of this invention comprise at least one chlorine containing elastomeric polymer and at least one other elastomeric polymer, generally of the hydrocarbon type. The chlorine containing elastomeric polymer, having flame proof qualities, is in general in an amount of about 15 to 75 parts by weight to about 85 to 25 parts by weight of the hydrocarbon elastomeric polymer. If larger amounts of the chlorine containing elastomeric polymer are used, the adhesive lacks quick stick and age resistant properties. On the other hand, if smaller amounts of chlorine containing elastomeric polymer are employed, the adhesive suffers in flame-proofness. Hence, it is desired that the elastomer contain another elastomeric polymer in addition to the chlorine containing elastomeric polymer in order to obtain the required adhesive characteristics. If so desired, the elastomeric polymer may consist solely of the chlorine containing elastomer, but such a composition does not exhibit a high-adhesive performance.

Examples of chlorine containing elastomeric polymers useful in forming the adhesives of this invention are the polychloroprene rubbers such as "Neoprene CRT," "Neoprene WRT," "Neoprene W," "Neoprene G.N." and "Neoprene G.N.A." Typical hydrocarbon elastomeric polymers which may be employed are natural rubber, e.g. pale crepe, smoked sheet, etc., as well as various rubbery polymer materials, such as butadiene and styrene, preferably those containing at least 40% butadiene and at least 10% styrene copolymerized therewith, polyvinyl ether polymers and reclaimed rubber. The neoprene may likewise be reclaimed neoprene polymer.

As indicated heretofore, tackifying resins are incorporated in the adhesives of this invention to impart normally tacky and pressure-sensitive characteristics thereto at normal room temperatures. Moreover, at least one of the tackifying agents must be a chlorine containing resin possessing flame proof qualities. In general, the other tackifying resins are of the hydrocarbon type resins. Then, too, the tackifying resins must be compatible with the elastomeric polymers combined therewith so as to not adversely affect the overall adhesive performance of the adhesive. It has been found that best results are obtained when the chlorine containing tackifying resin is in an amount from about 25 to 90 parts per 100 parts of the total tackifying resins. Advantageously, the chlorine containing tackifying resin, in addition to imparting tacky characteristics to the adhesive also contributes to its flame resistance because of its flame retardant and flame proof qualities.

Examples of suitable chlorine containing tackifying resins useful in forming the adhesives of this invention include chlorinated biphenyls manufactured by Monsanto Chemical Company and sold under the tradename "Arochlors." Examples of such chlorinated biphenyls are "Arochlor 1268," "Arochlor 4465," "Arochlor 5442" and "Arochlor 2565." "Arochlor 1268" is a chlorinated biphenyl which is a pale yellow opaque brittle resin having a specific gravity of 1.804 to 1.811 and a softening point (A.S.T.M.) of 135° to 160° C. "Arochlor 4465" is a chlorinated biphenyl which is a yellow transparent brittle resin having a specific gravity of 1.712 to 1.723 and a softening point (A.S.T.M.) of 60° to 66° C. "Arochlor 5442" is a chlorinated biphenyl which is a yellow transparent sticky resin having a specific gravity of 1.432 to 1.447 and a softening point (A.S.T.M.) of 48.5° to 53° C. "Arochlor 2565" is a chlorinated biphenyl which is a brown-black opaque resin having a specific gravity of 1.724 to 1.740 and a softening point (A.S.T.M.) of 66° to 72° C. Preferably, these chlorine containing tackifying resins should have a softening point in the range of about 113° F. to about 320° F. in order to obtain the desired adhesive characteristics. Typical hydrocarbon tackifying resins which may be employed are hydrogenated rosin, polymerized terpene resin, coumaroneindene resins, dehydrogenated rosin and oil soluble phenol aldehyde resins.

In order to obtain adhesives having excellent flame retardant and flame proof characteristics, the proportions of the elastomeric polymers and tackifying resins, and antimony trioxide should be in the ranges shown in the below recipes, the amounts being expressed in parts by weight.

| Ingredient | General Range | Preferred Range |
|---|---|---|
| Elastomeric Polymers (Chlorine containing elastomeric polymer and hydrocarbon elastomeric polymer)+Tackifying Resins (Chlorine containing tackifying resin and hydrocarbon tackifying resin) | 95-70 | 90-80 |
| Antimony Trioxide | 5-30 | 10-20 |

As indicated above, the elastomeric polymers and tackifying resins constitute between about 70 and about 95 parts per 100 parts of mixture with the remaining between antimony trioxide. If less than 5 parts of antimony trioxide are used per 100 parts of total mixture, the desired smothering effect on flame is not obtained. If over 30 parts of antimony trioxide are used, the composition is lacking in the desired tackiness. In general, the elastomeric polymers are in an amount of about 40 to about 60 parts to about 60 parts to about 40 parts of the tackifying resins.

The pressure-sensitive adhesive of this invention can be formed in any conventional manner as, for example, by compounding on a conventional rubber mill or Banbury type mixer, dispersing in an internal mixer such as a Baker-Perkins mixer, etc. Preferably, the adhesives are formed by mixing the elastomeric polymers and antimony trioxide with a portion of the tackifying resins and thereafter mixing the resulting mixture with a solvent and remaining components of the composition to obtain a relatively homogeneous solution of the adhesive.

Usually the compositions of this invention contain an anti-oxidant to stabilize it. Also, the formulation may be free of or include fillers, such as, zinc oxide, magnesium carbonate, calcium carbonate, titanium dioxide, aluminum, hydrated alumina, silica, etc. Other conventional ingredients for such formulations, such as dyes or pigments, plasticizers, etc., may be present or absent, dependent upon the particular desired use of the adhesive composition.

In forming the adhesive tapes of this invention, the adhesive composition may be coated on the backing element by any of the standard coating techniques, such as calendering, knife or reversed roll coating, extruding or similar well-known techniques. In practice, the pressure-sensitive adhesive composition of this invention is coated on the desired backing from a solution of its components in a suitable organic solvent, such as toluene, xylene, etc. The solution of the adhesive is of such viscosity that it is capable of being spread upon the backing with the heretofore indicated conventional coating apparatus. Moreover, the solution of the adhesive retains its viscosity for an adequate period of time to enable the adhesive composition and the solution to be formed in commercial quantities, and thereafter coated on the backing at a commercially convenient time.

In the formation of pressure-sensitive tapes employing the improved flame retardant and flame proof adhesives of this invention, the backing may be made of any suitable sheet material possessing flame retardant and flame proof characteristics. Examples of such sheets are the industrial glass fabrics, as exemplified by the woven fibrous glass cloth sold under the name "Hess-Goldsmith 116," "Hess-Goldsmith 113," "Hess-Goldsmith HG–16," and J. P. Schwebel & Co. Inc. Glass Cloth– Style Nos. 116, 113 and 1165. If improved bonding between the adhesive composition and the backing element is desired, the backing may be provided with a suitable conventional primer coating to improve the adherence of the adhesive thereto. Suitable primer coatings, for example, are those exemplified in Billings Patent No. 2,340,298 or Bemmels Patent No. 2,647,843. As indicated heretofore, the adhesives are preferably applied to the desired backing from solvent solution or dispersion using aliphatic or aromatic solvents with or without heat spreading and subsequent drying.

The following are examples of normally tacky and pressure-sensitive adhesives having improved flame retardant and flame proof characteristics and formed in accordance with this invention. It will be appreciated that these formulations are exemplary and the invention should not be construed as limited to the particular materials and proportions indicated; all proportions recited are in parts by weight.

EXAMPLE I

Parts by weight
GR–S #1022 (Butadiene-styrene copolymer rubber) 32
Neoprene WRT _____ 8
Antimony trioxide _____ 16
Chlorinated diphenyl resin _____ 22
Neozone D [phenyl-betanaphthylamine] _____ 1.0
Polyterpene resin _____ 10
Cumar P–10 resin [a mixture of polymerized coumarone and polymerized indene, M.P. 10° C.] _____ 11

EXAMPLE II

Pale crepe rubber _____ 23.5
GR–S No. 1022 _____ 8.0
Antimony trioxide _____ 10.0
Neoprene WRT _____ 8.0
Zinc oxide _____ 8.0
Age-Rite resin D [polymerized trimethyl dehydroquinoline, sp.g. 1.08 and M.P. 100–120° C.] ____ 0.5
Chlorinated diphenyl resin _____ 30.0
Polyterpene resin _____ 12.0

EXAMPLE III

Pale crepe rubber _____ 22.0
Neoprene WRT _____ 15.0
Antimony trioxide _____ 20.0
Chlorinated diphenyl resin _____ 30.0
Cumar-W [a mixture of polymerized coumarone and polymerized indene, M.P. 150–160° C.] ____ 12.5
Age-Rite resin D _____ 0.5

The following are examples of normally tacky and pressure-sensitive adhesive tapes having improved flame retarded and flame proof resistant characteristics and formed in accordance with this invention, utilizing the novel adhesive compositions. It will be realized that the particular adhesive compositions and backing elements employed are exemplary and the invention should not be construed as limited thereto.

EXAMPLES IV–VI

Each of the adhesive compositions of Examples I–III was formed into a substantially homogeneous mixture by the use of a Banbury type mixture. Each adhesive composition was then dispersed in toluene, after which all of the ingredients of each toluene-adhesive mixture was then mixed thoroughly until a homogeneous solution of the adhesive composition was obtained. These adhesives were then coated at a coating weight of 3 ozs./sq. yd. on a glass fabric (Hess Goldsmith No. 116) backing element.

In order to determine the flame retardant and flame proof qualities of the adhesives and tapes of this invention. the adhesive tape, prepared in accordance with Example IV, utilizing the adhesive composition of Example I, was tested by the method described in M.I.L.-T.-4053-A. This tape exhibited the following flame retardant and flame proof characteristics shown in below Table I.

Table I

| | |
|---|---|
| Breaking Strength (Pounds per inch of width) | 150 |
| Thickness | 0.0078 |
| Adhesion to steel (Ounce per inch of width) | 45 |
| Adhesion after heating (percent of Original) | 100 |
| Flame Resistance: | |
|     Flaming Time (Seconds) | 3 |
|     Length of Char (inch) | 0.5 |
| Corrosion of copper and aluminum | None |

The foregoing results show the tapes of this invention to be acceptable as flame proof and flame retardant tapes in accordance with the U.S. Government requirements as set forth in M.I.L.-T.-4053-A.

It will be appreciated that many variations in the invention described herein may become apparent to those skilled in the art to which this invention applies. It is to be appreciated that such variations are within the concept of the invention described herein and the invention is to be considered limited only by the appended claims.

What is claimed is:

1. A normally tacky and pressure-sensitive adhesive having improved flame resistant and flame proof characteristics comprising elastomeric polymers comprising per 100 parts by weight of polymer, 15 to 75 parts by weight of at least one chlorine containing elastomeric polymer selected from the group consisting of polychloroprene rubbers and reclaimed polychloroprene rubbers, and 85 to 25 parts by weight of one other elastomeric polymer selected from the group consisting of natural rubber, reclaimed rubber, butadiene-styrene copolymers containing at least 40% butadiene and at least 10% styrene and polyvinyl ether polymers, tackifying resins compatible with said elastomeric polymers and adapted to, and present in the adhesive in an amount of from 2:3 to 3:2 parts by weight of said adhesive, sufficient to render the composition tacky and pressure-sensitive at normal household temperatures, the latter comprising per 100 parts by weight of tackifying resin, 25 to 90 parts by weight of at least one chlorinated biphenyl tackifying resin and 75 to 10 parts by weight of one other tackifying resin, and antimony trioxide, said antimony trioxide being present in an amount of from about 5–30 parts by weight and said mixture of elastomeric polymers and tackifying resins being present in an amount from about 95–70 parts by weight.

2. A normally tacky and pressure-sensitive adhesive tape having improved flame retardant and flame proof characteristics comprising a suitable backing having flame retardant and flame proof characteristics, and having coated on at least one major surface thereof an adhesive composition comprising elastomeric polymers comprising per 100 parts by weight of polymer, 15 to 75 parts by weight of at least one chlorinated biphenyl elastomeric polymer selected from the group consisting of polychloroprene rubbers and reclaimed polychloroprene rubbers and 85 to 25 parts by weight of one other elastomeric polymer selected from the group consisting of natural rubber, reclaimed rubber, butadiene-styrene copolymers containing at least 40% butadiene and at least 10% styrene and polyvinyl ether polymers, tackifying resins compatible with said elastomeric polymers and adapted to, and present in the adhesive in an amount of from 2:3 to 3:2 parts by weight of said adhesive, sufficient to render the composition tacky and pressure-sensitive at normal household temperatures, the latter comprising per 100 parts by weight of tackifying resin, 25 to 90 parts by weight of at least one chlorine containing tackifying resin and 75 to 10 parts by weight of one other tackifying resin, and antimony trioxide, said amount of trioxide being present in an amount of from about 5–30 parts by weight and said mixture of elastomeric polymers and tackifying resins being present in an amount of from about 95–70 parts by weight.

References Cited in the file of this patent

UNITED STATES PATENTS

| | | |
|---|---|---|
| 2,319,959 | Tierney | May 25, 1943 |
| 2,461,538 | Fischer | Feb. 25, 1949 |

OTHER REFERENCES

"Nomenclature of Synthetic Rubbers," Fisher: Industrial and Engineering Chemistry, August 1939, pages 941 to 945.